Jan. 30, 1945. W. S. DIEHL 2,368,205
AIRCRAFT WING SLOT BAFFLE
Filed June 29, 1942
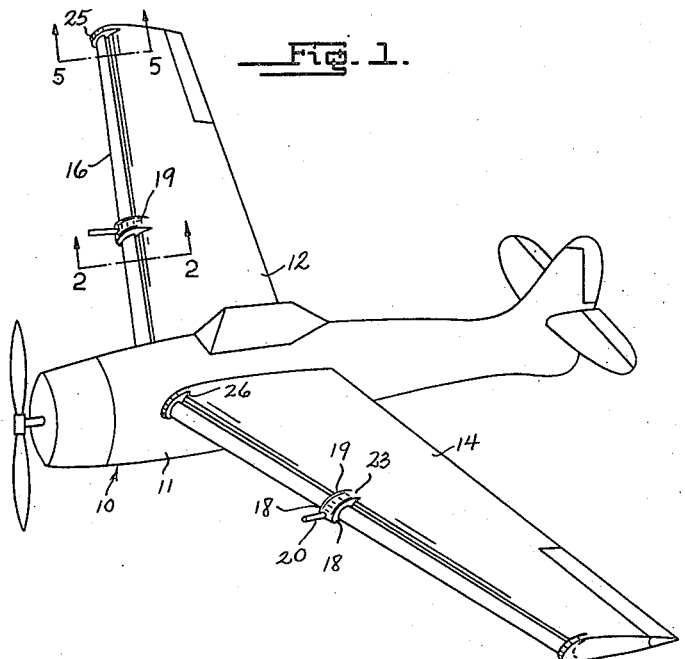
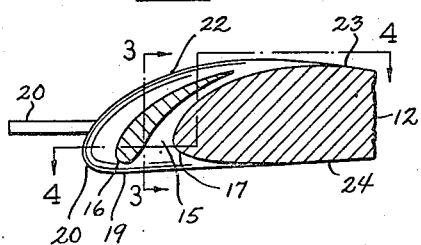
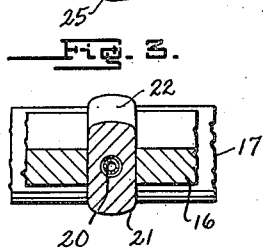
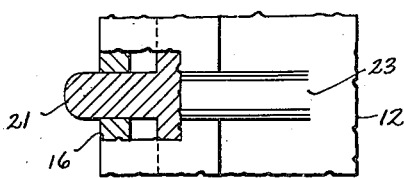
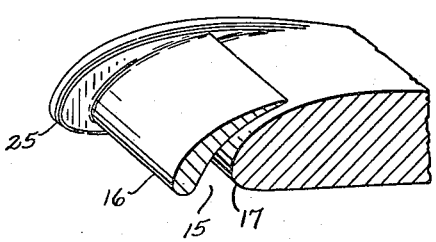
INVENTOR
Walter S. Diehl
BY
ATTORNEY Patented Jan. 30, 1945

2,368,205

UNITED STATES PATENT OFFICE 2,368,205

AIRCRAFT WING SLOT BAFFLE

Walter S. Diehl, United States Navy

Application June 29, 1942, Serial No. 449,016

2 Claims. (Cl. 244—91)

(Granted under the act of March 3, 1883, as amended April 30, 1928; 370 O. G. 757)

This invention relates to a slot baffle for aircraft and has for an object to provide an improved construction for aircraft of the "slot" type, that is, aircraft of the type having wing slots of the type generally known as the "Handley Page," or similar type.

It has been found that these wing slots do not always give satisfactory results, due to a disturbance in the air flow at the slot ends or other parts, for various reasons. This is particularly true where it is necessary to install some construction that acts as an obstruction and interference with the free flow of the air through the slot. An ideal construction of a wing slot on aircraft in order to produce satisfactory results exists when there is no disturbance of the air flow through the slot. Such construction, however, is often impossible of attainment, due to the necessity of placing certain features of the aircraft so that they will extend ahead of the leading edge, which necessitates extending across the wing slots. Such constructional features may be for instance the Pitot tube or other instruments, as well as cannon or machine guns in the case of fighting aircraft.

It is an object of this invention to provide a means for eliminating or reducing the disturbance in the air flow caused by the presence of such obstructions.

In many cases a further disturbance is provided by the fact that it may be essential to provide more obstructions to the air flow through the air slot on one wing than on the other, thus tending to throw them out of balance. A further object of this invention is to provide construction which so eliminates disturbances caused by this unbalance of the wing that substantially proper balance is restored in spite of such obstructions.

A further object of this invention is to eliminate the disturbing air flow caused by an obstruction in the wing slot by providing a baffle projecting forward from the wing which thus provides substantially plane sides that will confine all of the flow through the slot to a fore and aft direction.

With the foregoing and other objects in view, the invention consists in the construction, combination and arrangement of parts hereinafter described and illustrated in the drawing, in which:

Fig. 1 is a perspective view of an aircraft to which this invention has been applied.

Fig. 2 is a sectional view on line 2—2 of Fig. 1.

Figs. 3 and 4 are sectional views on lines 3—3 and 4—4 of Fig. 2; and

Fig. 5 is a sectional view on line 5—5 of Fig. 1.

There is shown at 10 an aircraft having its fuselage 11 provided with customary wings 12 and 14 having a conventional type of wing slots 15 between the slat 16 and the leading edge 17 of the wings. It has been found that a marked increase in lift is usually lost at the ends of the slot in addition to that lost by the presence of any obstructions necessarily present throughout the length of the slot. This invention overcomes this defect by providing baffles about any obstructions through the wing slot, as well as at the ends of the wing slot, including the wing roll where the slot cannot come all the way into the fuselage, as well as at the wing tip or any marked change in the leading edge taper. This baffle 19 may be located anywhere as desired along the wing span and, as shown, consists of baffle plates 18 on opposite sides of an enlarged leading baffle tip 21. This leading tip 21 is shaped substantially identical to the leading edge 17 but on a slightly enlarged scale, and projects forwardly therefrom across the slot 15 and somewhat forwardly of the slat 16. This leading tip 21 is of sufficient width together with the baffle plates 18 to completely enclose the obstruction, in this case a gun barrel 20. This leading tip 21 is streamlined as at 22 and fairs smoothly into the wing 12 as at 23 and 24. As a result of such baffle the air flow coming through the slot 15 does not have its direction disturbed by the presence of the gun barrel 20 but instead it flows smoothly in a fore and aft direction just as though the slot were entirely unobstructed.

The disturbance in the air flow generally present at either end of the slot is eliminated by the presence of a similar baffle plate 25 at the wing tip and another baffle plate 26 at the wing roll between the wing and the fuselage. The only difference between baffles 19, 25 and 26 is in their width, which width is appropriate to their particular use. At the wing roll and wing edge only narrow baffles are needed but at intermediate points along the wing span the baffles are made of a width appropriate to the particular obstruction whose air flow disturbance through the wing slot is to be overcome. Just as the baffles 25 and 26 substitute for brackets in supporting the ends of the slat 16, so can intermediate baffles be provided wherever necessary when the wing span is too great to permit the wing slat to be unsupported or unattached at intermediate points. Obviously, the baffle 19 herein shown acts as a center support as well as streamlined fairing about the gun barrel 20.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In an aircraft wing having a leading edge and a leading slat providing a leading edge slot therebetween, a baffle having a passageway extending longitudinally therethrough, said baffle extending across the wing slot from the leading edge of the wing to beyond the leading edge of the wing slat, a gun barrel in said passageway and extending across the wing slot, said baffle being faired into the wing, said baffle having a plane side.

2. In an aircraft wing having a leading edge and a leading slat providing a leading edge slot therebetween, a baffle having a passageway extending longitudinally therethrough, said baffle extending across the wing slot from the leading edge of the wing to beyond the leading edge of the wing slat, a gun barrel in said passageway and extending across the wing slot, said baffle being faired into the wing.

WALTER S. DIEHL.